July 2, 1963 R. A. WILLIAMS 3,096,259

METHOD OF MANUFACTURING SEMICONDUCTIVE DEVICE

Original Filed July 3, 1957 2 Sheets-Sheet 1

INVENTOR.
RICHARD A. WILLIAMS
BY
Albert L. Free
AGENT

METHOD OF MANUFACTURING SEMICONDUCTIVE DEVICE

Original Filed July 3, 1957 2 Sheets-Sheet 2

INVENTOR.
RICHARD A. WILLIAMS
BY Albert L. Freer
AGENT

United States Patent Office 3,096,259
Patented July 2, 1963

3,096,259

METHOD OF MANUFACTURING SEMICONDUCTIVE DEVICE

Richard A. Williams, Collingswood, N.J., assignor, by mesne assignments, to Philco Corporation, Philadelphia, Pa., a corporation of Delaware Continuation of abandoned application Ser. No. 669,852, July 3, 1957. This application Sept. 1, 1960, Ser. No. 56,619
3 Claims. (Cl. 204—15)

The present invention relates to semiconductor devices and methods for the fabrication thereof, and particularly to the fabrication and structure of semiconductor devices of the type employing a base region in which the resistivity varies as a function of position therein. This application is a continuation of my copending application Serial No. 669,852, filed July 3, 1957, now abandoned, entitled, Semiconductive Device and Method for the Manufacture Thereof.

Semiconductor devices have been proposed in the past which would make use of semiconductive bodies having regions in which the conductivity is of a single type but in which the resistivity varies as a function of position in the region, preferably changing smoothly and substantially exponentially in a predetermined direction in the body. Such structures have been of primary interest in transistors in which the regions of varying conoductivity comprise the base elements thereof. Thus it has been found that a transistor of advantageous electrical characteristics is obtained when the resistivity of the base region is relatively low immediately adjacent the emitter element and relatively high immediately adjacent the collector element of the transistor. The low resistivity adjacent the emitter reduces the base resistance of the transistor, while the high resistivity adjacent the collector reduces the collector capacity, both of which factors tend to increase high frequency performance, particularly where the base width is very small. A further increase in high frequency performance is realized when the resistivity changes exponentially between its value at the emitter and its value at the collector. Such a variation produces an electric field in the base which urges the minority-carriers from emitter to collector, thereby reducing the transit time required when only diffusion of minority-carriers is relied upon. Transistors having such base regions have been designated as graded-base transistors to contrast them with types of transistors in which the base region is of substantially uniform resistivity throughout at least a substantial portion of its thickness.

While the desirability of such transistors has been recognized, it has not heretofore been possible to fabricate them reproducibly with the desired characteristics. One of the basic reasons for this difficulty in fabrication stems from the fact that, while the resistivity of the base adjacent the emitter should be relatively low, if it be too low the injection efficiency of the emitter may be impaired; and, while the resistivity of the base adjacent the collector should be relatively high, if it be too high the collector saturation current $I_{co}$, becomes excessively large. Other factors such as collector break-down voltage and punch-through voltage may also enter into the determination of the values of base resistivity desired, but in any event it is important to the obtaining of the characteristics desired in any particular application that the resistivity of the base at various points therein, and especially immediately adjacent the emitter and collector elements, be accurately controlled.

In one attempted method of fabrication of such devices, a body of substantially intrinsic, high-resistivity semiconductive material of substantial thickness is subjected to vaporous surface diffusion by the vapor of an impurity metal suitable for producing a thin surface layer of reduced resistivity in the otherwise high-resistivity body. This latter layer is intended ultimately to provide the base region of the semiconductor device, and has a conductivity which is greatest at its exterior surface and least at the internal side thereof. Having thus formed the diffused base region, a metal producing a conductivity type opposite to that of the base is then alloyed into the layer from the surface thereof, thereby to form an emitter junction in the surface layer. A collector junction is then formed by alloying a suitable metal, such as that used to form the emitter junction, into the body from its opposite side to an extent sufficient to produce a second junction near the internal side of the surface layer. If the collector junction is thereby located immediately adjacent or within the surface layer, the resultant device comprises a so-called graded-base transistor structure, whereas if the latter junction does not extend as far as the internal side of the surface layer, the device is similar to the so-called P-N-I-P transistor in that there exists an intrinsic region of substantial thickness between the collector and base regions.

One of the difficulties arising in fabrication of such devices is that when, as in very high frequency transistors, the thickness of the surface layer is extremely small, e.g. of the order of about 0.1 thousands of an inch or less, and when, as is often the case, the resistivity of this layer varies throughout its thickness by several orders of magnitude, it becomes extremely difficult to control the depth of the alloying employed in forming the emitter and collector elements with sufficient accuracy to locate the emitter and collector junctions at precisely the points within this thin layer having exactly the optimum resistivity, and it has in fact been a practical impossibility to do so reproducibly. Furthermore, even minor deviations from optimum in the positioning of the active elements produce serious variations in the operating characteristics of the completed devices. Thus it has been found that if the emitter is alloyed too far into the body by only a very slight amount—e.g. of the order of hundredths of a mil—then the high-frequency operation of the transistor is degraded, while if it is alloyed only slightly too little, the alpha of the transistor is adversely affected. In the case of the positioning of the collector junction, if the collector barrier is alloyed slightly too far into the body the collector capacitance is increased undesirably, while if it is alloyed only slightly too little, there will remain an intrinsic region of substantial thickness between the interior side of the surface layer and the collector junction which alters markedly the operating characteristics of the resultant transistor, especially with regard to the minimum collector voltage which can be employed.

It will therefore be appreciated that conventional diffusing methods and alloying techniques are not appropriate to the fabrication of such devices with the accuracy and uniformity necessary to provide reproducibly the electrical characteristics desired in any given application. It has in fact been true that the potentialities of the graded-base type transistor have not heretofore been fully realized because of the practical difficulties encountered in fabricating them by previously-available methods.

Another factor which contributes to improved high-frequency performance in transistors of this type is the provision of a low-resistance path from the base connection to the region of the semiconductive body immediately adjacent the emitter element. While lowering of this resistance is to some extent achieved by utilizing a metallic base connection surrounding the emitter element and closely-spaced therefrom, practical considerations limit the extent to which the spacing between base connection and emitter element can be reduced without danger of short-circuiting the emitter to the base contact. While the heavily-doped surface layer produced by the above-described procedure tends further to reduce the resistance between the edge of the base tab and the emitter region, special steps have been necessary to insure that this surface layer does not itself short-circuit the base connection directly to the emitter. For example it has been typical to subject the unit to intensive etching after fabrication to remove the high-conductivity layer in the region between emitter and base tab. However, the benefits of the low-resistance surface in producing low base resistance are then substantially reduced.

Accordingly it is an object of my invention to provide a method whereby a rectifying connection to a semiconductive body is produced immediately adjacent a region of predetermined resistivity in said body in which the resistivity differs substantially at various points therein.

Another object is to provide a method for producing a pair of rectifying connections to spaced regions of a semiconductive body, said regions having predetermined different values of resistivity.

A further object is to provide a method for producing a first rectifying connection to a body of semiconductive material and a second rectifying connection to said body closely-spaced from said first barrier, the material of said body immediately adjacent said first connection having a resistivity substantially greater than that immediately adjacent said second connection.

Still another object is to provide a method for producing a transistor of the graded-base type in which the emitter and collector elements thereof are very closely spaced and in which each is located immediately adjacent a region of the base having precisely a predetermined resistivity value, the resistivity values in said regions immediately adjacent said emitter and collector differing substantially from each other.

It is also an object of the invention to provide a method for producing a plurality of transistors of substantially the same characteristics, each having a base region characterized by a resistivity which increases progressively from the emitter to the collector side thereof.

A further object is to provide an improved semiconductive structure characterized by extremely high frequency of operation.

Still another object is to provide a transistor device characterized by low base resistance, low collector capacity and low transit time between emitter and collector elements.

Still another object is to provide such a device which employs an emitter and collector element and an intervening base element, the resistivity of the base element being graded upwardly in the direction from said emitter element to said collector element.

In accordance with the invention the above objects are achieved, in general, by the provision of a method in which a semiconductive body of non-uniform resistivity is provided with a rectifying connection located immediately adjacent a region of predetermined resistivity therein by controlledly removing semiconductive material from the body until a surface immediately adjacent said region is exposed, and then forming said rectifying connection at, or immediately under, said exposed surface. It will be understood that the term "rectifying connection" as utilized herein includes within its scope any transition in structure which produces asymmetrical electrical conduction, such as transitions between semiconductive regions of differing conductivities of the type existing in P-N junctions, or transitions between metals and semiconductors of the type employed in surface-barrier contacts or point contacts.

In a preferred form of the invention as applied to the fabrication of a transistor having emitter and collector elements and an intermediate base region, the region of non-uniform resistivity is formed by diffusing an impurity metal into the surface of the semiconductive body to produce a thin surface layer of graded resistivity having at the exterior side thereof a resistivity lower than that desired in the base region adjacent the emitter barrier, and having at the interior side thereof a resistivity at least as great as that desired for the region of the base adjacent the collector barrier; for transistors of very high frequencies of operation the gradient of resistivity in the layer is substantially exponentially related to distance into the body from the surface thereof, throughout at least a substantial portion of the layer. The surface of the body is then jet-electrolytically etched from the exterior side of the surface layer to expose that region of the surface layer which possesses the value of resistivity desired in the base region adjacent the emitter. Preferably the opposite surface of the body is also jet-electrolytically etched to expose the region of the body which is optimum for the location of the collector barrier. The emitter barrier and the collector barrier are then formed at, or immediately under, the corresponding exposed surfaces of the semiconductive body and therefore at their optimum locations, as by the application of surface-barrier or micro-alloy connections.

During the process of fabricating such a transistor, a base tab is ohmically affixed to the semiconductive body, preferably to the aforementioned surface layer. Since the exterior surface of the layer may be of very low resistivity, it provides a low resistance path from the base tab to the vicinity of the periphery of the emitter element as is desired to produce the low values of base resistance required for superior high frequency performance. However, because the emitter is located within an etched depression in the layer, the resistivity of the semiconductive material adjoining it is higher than that at the surface and a small region of higher resistance is therefore provided between the emitter and the low-resistance surface layer. This small region of higher resistivity serves to prevent direct short-circuiting of the emitter to the base, while preserving the desired low base resistance.

To provide exposed surfaces of the diffused base layer having precisely the desired values of resistivity, it is important to terminate the etching action at precisely the proper time. In practice this time may be determined experimentally by fabricating a series of transistors with different etching times and observing the characteristics of the resultant devices. However, to limit the amount of such experimentation required for any group of similar semiconductive wafers, I have found it advantageous to form surface layers in a large lot of wafers under identical conditions, so that the values of resistivity existing at corresponding distances beneath the surface are substantially the same for all blanks, and then to determine the profile of the resistivity gradient in a typical blank of the lot by alternately etching the surface of the blanks and measuring the resistivity of the etched surface and the depth of etching. Preferably the etching is performed in the same manner as the etching of the emitter side of the surface layer during transistor fabrication, and the time of etching is noted at each depth measurement. From the resistivity profile thus obtained there can be determined the depths beneath the surface of the regions to be exposed by the etching process, as well as the time duration of the jet-etching of other blanks of the same lot which is required to expose these regions.

Since the desired distance between the emitter and collector barriers is also known, as from a profiling procedure for example, etching from the collector side may then be performed until the thickness of the body equals this desired distance, as controlled for example by the infrared thickness control system described in the copending application Serial No. 449,347, now Patent No. 2,875,141, of R. N. Noyce, filed August 13, 1954, and entitled, "Electrical Method and Apparatus." Metallic deposits may then be jet electrolytically plated upon the emitter and collector sides of the jet-etched region to form surface-barrier elements thereon, which may be used directly as emitter and collector or may be heated slightly for a short period to produce alloyed regions of negligibly small thicknesses.

In this manner I have found it possible to fabricate reproducibly transistors having maximum oscillation frequencies of at least 1,000 megacycles per second and operable with relatively high collector supply voltages of the order of 30 volts and relatively high collector signal-voltage variations of the order of 30 volts peak-to-peak.

Other objects and features of the invention will become apparent from a consideration of the following detailed description taken in conjunction with the accompanying drawings, in which.

Describing the invention now in detail, the embodiment first to be set forth is by way of example only and represents one specific application of the method to the fabrication of germanium transistors of the so-called micro-alloy drift type (MADT), which have been found capable of operation at extremely high frequencies of the order of 1,000 megacycles per second.

In the first step of this process there is prepared a lot of similar semiconductive wafers of uniform high resistivity and of a suitable semiconductive material such as 20 ohm-centimeter, antimony-doped, N-type germanium having a minority-carrier lifetime of about 50 to 500 microseconds, which may be cut from a single-crystalline ingot and size-etched to convenient dimensions, for example 0.100" x 0.100" x 0.003".

Figure 1:
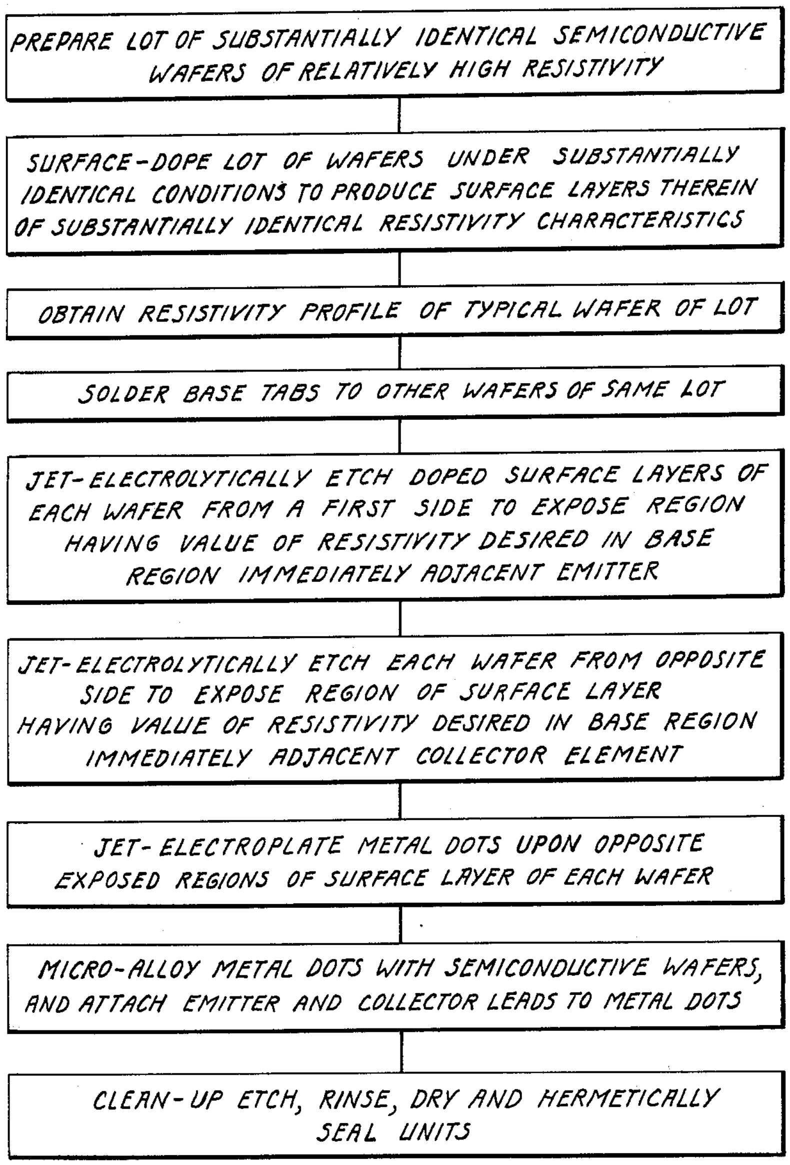
FIGURE 1 is a flow diagram illustrating the process of the invention in one of its possible forms.
Figures 2A, 2B, 2C, 2D, 2E:
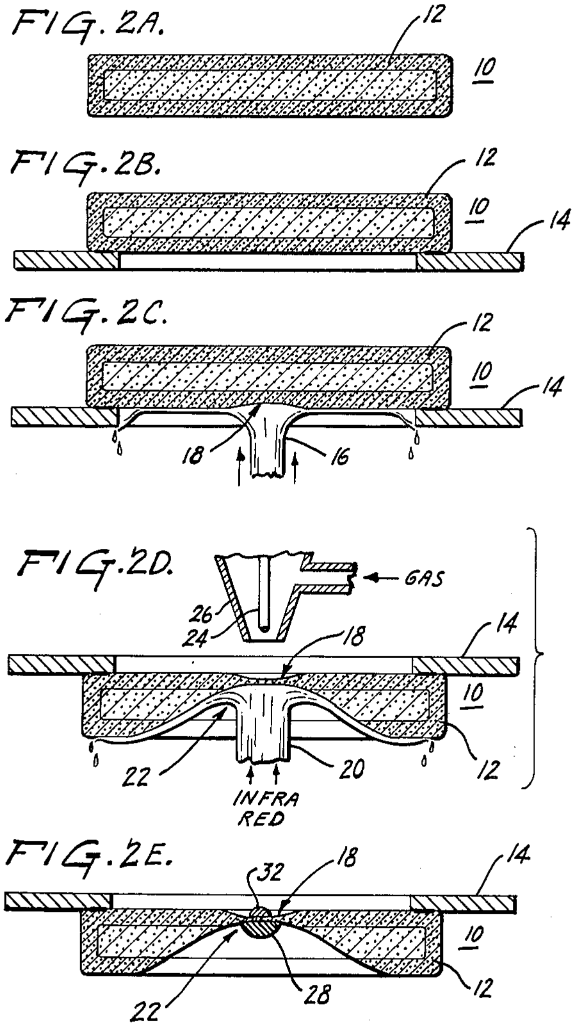
FIGURES 2A, 2B, 2C, 2D and 2E are cross-sectional views of a body of semiconductive material at successive stages in the fabrication procedure of FIGURE 1.
Figure 3:
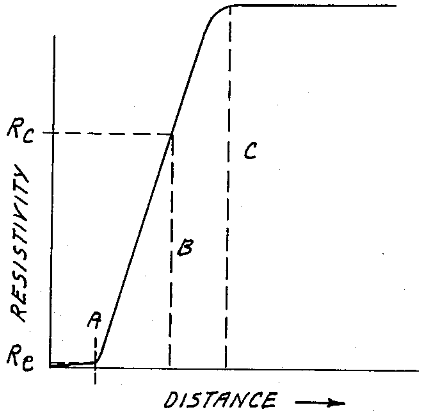
FIGURE 3 is a graphical representation to which reference will be made in describing the practice of the invention in one of its forms.

Each of these wafers is then provided with a more strongly N-type surface layer under carefully controlled conditions, so that the resistivity gradient is substantially the same for all wafers. Such a wafer is represented in FIGURE 2A, wherein there is shown a semiconductive body 10 provided with a surface layer 12 which may be of the same conductivity type as the interior of body 10, but of lower resistivity. The surface layer is preferably provided by immersing the lot of wafers in an environment substantially uniformly rich with an N-type impurity metal, so that the dopant metal diffuses into the surface and produces a concentration of added impurity atoms which, through at least a substantial portion of the layer, decreases substantially exponentially with increasing distance into the body, i.e. substantially as the function $N_0e^{-K_1(X-X_0)}$, where $N_0$ is the concentration of added impurity atoms at a point $X_0$ adjacent the exterior of the surface layer, X is the distance into the body from the point $X_0$, $K_1$ is a constant and $e$ is the Naperian logarithmic base. Since the resistivity varies substantially in inverse proportion to the impurity concentration, the resistivity in ths portion increases substantially exponentially with distance into the surface layer, substantially at the function $R_0e^{K_2(X-X_0)}$, where $R_0$ is the resistivity at $X_0$ and $K_2$ is a constant. A typical resistivity distribution is represented in FIGURE 3, wherein abscisae represent distance into the body from the surface and ordinates represent resistivity of the material. The portion of the curve between the axis of ordinates and the line C corresponds to the surface layer 12, the portions of the curve to the right of C representing the interior or bulk of the wafer. Preferably the values of resistivity $R_e$ and $R_c$ desired for the regions of the base adjacent the emitter element and the collector element, respectively, occur within the surface layer, as represented by lines A and B in FIGURE 3.

The details of such surface diffusion methods are well known in the art and need not be described in detail herein. In one possible form of this procedure the prepared blanks are placed in a radiant oven of the Lindberg type along with a suitable volatile dopant, such as phosphorus, for a predetermined length of time. Thus, in one application 100 germanium wafers and about 4 milligrams of phosphorus were placed in a radiant oven maintained at 775±10° C. for about 30 minutes, while a controlled flow of hydrogen was passed over the phosphorus and then over the wafers. The oven was then cooled to about 450° C. at the rate of 10° C. per minute, after which the wafers were removed and allowed to cool at room temperature. With this procedure surface layers of about 0.1 mil thickness were provided which had resistivity values of about 0.0005 ohm-centimeters at their external surfaces, and values within the layers which increased toward the interior to the bulk value of resistivity of the center of the wafer, following a substantially exponential function at least over the region extending from a point about 0.02 mil beneath the surface to a point about 0.08 mil beneath the same surface. In this diffusion process precautions should ordinarily be taken to insure against contamination of the wafers by undesired impurities such as copper, inherently present in the diffusing equipment, and for this reason it has been found desirable to immerse the surface-doped germanium wafers in hot potassium cyanide at 800° C. for about 10 minutes to leach out any traces of copper.

Having provided the lot of semiconductive wafers with substantially identical surface layers, I prefer to obtain a profile, similar to that shown in FIGURE 3, of the surface layer of a typical wafer of the lot, thereby to determine the resistivity at various points in the surface layer of each of the other substantially identical wafers. Such a profile can be obtained by alternately etching the selected pilot wafer and measuring its thickness and resistivity by conventional means. However, where the surface doping procedure is adequately controlled so that layers of predetermined thickness can be produced at will, this procedure is not essential.

To facilitate optimum location of the emitter elements in the other wafers of the lot, I have found the following limited profiling procedure to be especially advantageous. One of the wafers of the lot is subjected to jet-electrolytic etching beginning at the outer surface and progressing into the surface layer, preferably under conditions of jet-etching substantially identical to those later employed in jet-etching the emitter sides of the other wafers, and the time duration of etching is recorded throughout the process. However, this jet etching is interrupted repetitively to provide intervals during which the resistivity of the exposed surface of the semiconductor is measured. In the case of semiconductors such as N-type germanium which readily form rectifying surface-barrier contacts with applied metals, the resistivity measurement is preferably accomplished by applying such metal to the exposed surface, measuring the breakdown voltage of the resultant rectifier, and then removing the metal. One particularly advantageous method for doing this is to jet-electroplate upon the jet-etched surface a metal which provides such a surface-barrier, and then to apply a reverse-biasing potential to the metal to determine the value of diode breakdown voltage of the diode thus formed. From the value of diode-breakdown voltage the resistivity of the material adjacent the metal can be readily determined from the following well-known relationship:

$$V=70\rho^{1/2}$$

where V is the breakdown voltage in volts, and $\rho$ is the resistivity of the semiconductive material in ohm-centimeters. After each such measurement the deposited metal can be chemically etched away without removing semiconductive material, and the jet-etching then resumed. For example indium may be jet-electroplated upon N-type germanium, the breakdown voltage of the indium-germanium diode measured, and the indium dot then removed by washing with indium sulphate.

By this procedure there is determined the time duration of jet-etching required to expose semiconductive material having the resistivity value desired in the base region adjacent the emitter. The same jet-etching time and conditions may then be utilized later in the process in exposing the region in the other wafers in which the emitter elements are to be formed.

Having determined the locations desired for the emitter and collector elements, each of the wafers having the surface doping described hereinbefore may be provided with a soldered base tab 14 as shown in FIGURE 2B, producing an ohmic connection to the surface layer. To obtain low base resistance, the base tab 14 is preferably of such configuration as to surround the etched emitter depression, and conveniently may comprise a rectangular piece of nickel having a circular aperture therein slightly larger than the emitter depression and concentric therewith.

As represented in FIGURE 2C, the surface layer 12 may next be impinged by a jet 16 of a suitable electrolytic etchant to form the depression 18 therein. The time and rate of etching are controlled so that the semiconductive material exposed at the bottom of depression 18 has the resistivity desired for the base region immediately adjacent one of the active elements of the ultimate device, which in the present case is assumed to be the emitter element. Methods for performing jet-electrolytic etching are described in detail in the copending application Serial No. 472,824, now Patent No. 3,067,114, of J. W. Tiley and R. A. Williams, filed December 3, 1954 and entitled "Semiconductive Devices and Methods for the Fabrication Thereof," and hence need not be set forth herein in detail. In general, the process is performed in the present application by directing a jet of a suitable electrolyte upon the region to be etched while maintaining the base tab 14 positive with respect to the jet stream 16. Preferably the parameters of the jet etching process are substantially identical with those of the above-described pilot-etching procedure for profiling, and the duration of the etching may then be the same as that determined to be appropriate by that procedure.

Typically the semiconductor material thus exposed may have a resistivity of the order of 0.01 ohm-centimeter, and may be located about 0.02 mil beneath the exterior surface of the layer. In one example the jet employed was 6 mils in diameter, composed of 0.2 normal sulphuric acid, and was applied with an etching current of about 0.4 milliamperes for about 2 seconds.

As shown in FIGURE 2D, next the surface of the blank 10 opposite the emitter depression 18 may be electrolytically etched by the jet 20, which is preferably of larger diameter than the jet 16 used to etch the emitter side thereof. In a typical case where the bulk of the body 10 is of substantially 20 ohm-centimeter resistivity and the collector element is ultimately to be placed upon a region of the base material having about 10 ohm-centimeter resistivity, the jet etching is caused to proceed through the surface layer on the opposite side of the blank from the emitter depression, through the bulk of the body and slightly into the interior side of the same surface layer in which the emitter depression was formed. In one typical case the jet 20 was 8 mils in diameter, composed of 0.2 normal sulphuric acid, and jet electrolytic etching was continued until approximately 0.06 mil remained between the bottom of the etched collector depression 22 and the bottom of the opposed emitter depression 18, a thickness which may be achieved by employing the infra-red thickness control described in detail in the above-cited copending application of Robert N. Noyce. As represented schematically in FIGURE 2D, in this control process infra-red radiations may be supplied by way of the jet 20 to the semiconductive material under the jet, while a photocell 24 detects at least some of the infra-red radiations transmitted through the portion of the semiconductor body remaining between the emitter and collector depressions. Suitably a dry gas is simultaneously impinged upon the surface of emitter depression 18 by way of the cone 26, so as to keep this surface free of moisture. Indications derived by the photocell 24 may be displayed graphically by an automatically-recording instrument as the jet 20 etches into the body 10, the optical properties of the measuring system preferably being chosen so as to produce readily-identifiable indications upon the attainment of the desired thickness as described in the Noyce application.

Having thus exposed regions of the semiconductive body closely spaced from each other and having the values of resistivity desired for the regions immediately adjacent the emitter and collector elements of the ultimate transistor, it remains to form the emitter and collector connections in these regions. In one embodiment of the invention I accomplish this by jet-electrolytically depositing surface-barrier forming metal dots upon the substantially parallel bottoms of the opposed emitter and collector depressions. Thus, as shown in FIGURE 2E, a dot 28 of a metal such as indium may be jet-electroyltically deposited on the bottom of the collector depression 22. Suitable jet-electroplating methods are also described in detail in the above-mentioned application of Tiley and Williams, and, in this instance, may be performed by directing against the bottom of the depression a jet of an electrolyte containing ions of the metal to be plated while maintaining the base tab 14 negative with respect to the jet. Preferably the jet utilized for plating is somewhat smaller in diameter than that used for etching, and in a typical case in which the collector etching jet was 8 mils in diameter the collector plating jet stream may be 5 mils in diameter and composed of 8.7 grams per liter of indium sulphate and 7 grams per liter of ammonium chloride.

A surface-barrier forming emitter contact may be provided at the bottom of depression 18 in an analogous manner, preferably utilizing a plating jet smaller than that utilized to etch the depression 18. In a typical example in which the emitter etching jet was 6 mils in diameter, the plating jet stream may be 3 mils in diameter and composed of the same solution utilized in depositing the collector dot. The resultant metal dot 32 then produces a surface-barrier at the adjacent semiconductor surface in the region of desired resistivity, closely-spaced from the opposed collector surface-barrier.

Although, when appropriate metals are thus deposited, the surface-barrier contacts themselves may be utilized as the emitter and collector elements of the ultimate device with excellent results, particularly in the case of N-type germanium, nevertheless I have found that certain of the electrical properties of the device which are useful in particular applications may be even further improved by micro-alloying the metallic deposits with the semiconductive body, in which process the electrical properties of alloyed contacts are obtained without altering substantially the geometry existing in the surface-barrier form of the device. In this process the amount of penetration of the metal into the surface of the semiconductor is negligible, being of the order of 0.001 mil in typical cases. Structures and methods appropriate to obtaining the desired micro-alloyed contacts are described in detail in my copending application Serial No. 582,723, now Patent No. 2,930,108, filed May 4, 1956 and entitled "Method for Fabricating Semiconductive Devices," and in the copending application of A. D. Rittmann, Serial No. 585,670, now Patent No. 2,870,052, filed May 18, 1956, and entitled "Semiconductive Device and Method for the Fabrication Thereof."

Figure 4:
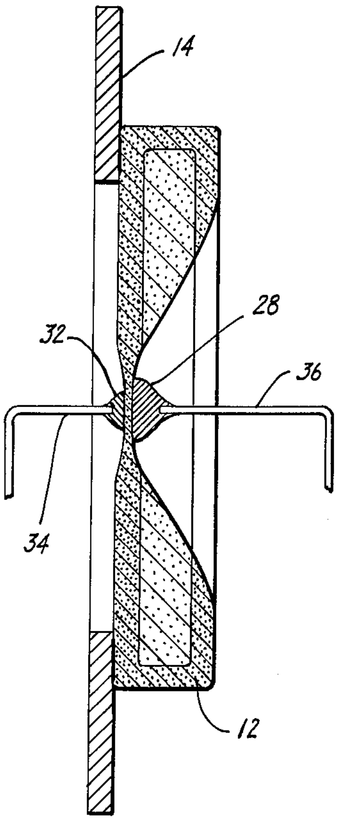
FIGURE 4 is a cross-sectional view of an operable device in accordance with the invention in one aspect thereof.

As described in the last-mentioned application, the desired micro-alloying may be produced during the soldering of the leads to the emitter and collector contacts. Accordingly, whether the surface-barrier contacts are to be utilized without micro-alloying or micro-alloying is to be performed, the step following the deposition of the metallic emitter and collector dots may be attachment of the corresponding emitter and collector leads. The resultant structure is shown in FIGURE 4, in which the emitter dot 32 is soldered to the emitter lead 34, while the collector dot 28 is soldered to the collector lead 36. If the contact is to be a surface-barrier contact, the soldering is performed sufficiently rapidly and at sufficiently low temperatures that the metal of the contact and of the solder do not penetrate the semiconductor. In this case indium may be used as the solder, applied to the contact between the lead and the deposited dot, and heated just sufficiently to melt it and to solder the lead to the dot without melting the portion of the dot in contact with the germanium. However, if micro-alloying is employed, the solder may suitably consist of 99% indium, 1% gallium, which may be applied to the end of the lead prior to application of the lead to the deposited indium, and the temperature employed for soldering is just high enough, and applied for just long enough, to melt the solder and to convert the dots momentarily to liquid form; however, the temperatures and time are insufficient to permit any substantial degree of alloying of metal into the body. Nevertheless, because of the ability of the gallium to produce extremely high carrier densities in the semiconductor, the emitter and collector properties are thereby substantially improved.

Following the attachment of emitter and collector leads, the unit may be subjected to a clean-up procedure consisting of immersion for several seconds in a solution of 15 parts of 85% glacial acetic acid, 8 parts of 69.5% nitric acid and 5 parts of 49% hydrofluoric acid, after which it may be potted in an appropriate compound and hermetically sealed in a metal container according to conventional procedures.

With regard to the transistor structure represented in FIGURE 4, it is noted that while the surface of the layer 12 is of very low resistivity, typically of the order of 0.0005 ohm-centimeter, so as to provide a connection of low resistance to the surrounding base tab 14, the emitter connection 32 is located at the bottom of a slight depression in this layer where the resistivity is orders of magnitude higher, typically of the order of 0.01 ohm-centimeter, and is therefore not short-circuited to the base tab 14. However, because the diameter of the etch pit in which the emitter contact is located is very small, typically of the order of 10 mils, the low-resistivity portion of the surface layer extends to within a few mils of the emitter, and very low base resistance is therefore obtained.

Further with regard to the structure shown in FIGURE 4, it is noted that there is no layer of high resistivity, or substantially intrinsic, material between the collector barrier and the surface layer which constitutes the base region between emitter and collector elements. The elimination of such a layer provides many of the important electrical improvements in the resultant transistor, for the reasons that efficient collection by the collector is obtained even for extremely low collector voltages, whereas the existence of an intervening layer of substantially intrinsic material would make necessary relatively high minimum collector voltages in order to cause the depletion region adjacent the collector contact to extend through the intrinsic layer to the lower resistance portion of the base. However, it will be understood that many of the advantages of the invention are still obtained when the invention is applied to produce devices in which this higher-resistance, or substantially intrinsic, layer is merely reduced greatly from that obtainable by other methods, rather than completely eliminated.

As an example, in one typical device made by the above-described procedure and utilizing the specific values given as typical examples in the preceding description, the following characteristics were obtained:

Transistor alpha ($\alpha$)=0.9
Emitter diode-breakdown voltage ($V_{de}$)=3 volts
Collector diode-breakdown voltage ($V_{dc}$)=25 volts
Collector resistance ($r_c$)=100 k
Product of high frequency base resistance and collector capacitance ($r'_bC_c$)=50 micromicroseconds
Collector output capacity of complete transistor ($C_o$)=2 micromicrofarads
High-frequency base resistance ($r'_b$)=40 ohms
Maximum frequency of oscillation ($f_{max}$)=500 megacycles per second
Grounded-emitter collector-breakdown voltage ($V_{max}$)=25 volts
Grounded-base collector saturation current with zero emitter current ($I_{co}$)=3 microamperes Power output of an oscillator using the transistor as the amplifying element was equal to or greater than 35 milliwatts at 100 megacycles per second for an input power of 100 milliwatts.

It will be understod that the semiconductive body of non-homogeneous resistivity may be provided in a variety of different ways. For example, in fabricating an N-type germanium transistor of the type described in detail hereinbefore, the surface layer may be formed by a process in which diffusion of the desired impurity metal is effected by dissolving the impurity metal in a bath of hot potassium cyanide solution and immersing the semiconductive wafers in the solution. In this process diffusion occurs from a liquid phase, rather than from a gas, and the potassium cyanide solution serves simultaneously to produce the desired leaching action by which undesired impurities such as copper are removed from the wafer. Furthermore, although the desired localized removal of semiconductive material is advantageously accomplished by the above-described jet-electrolytic processes, other processes may also be used in certain applications; for example one may employ the carrier-enhanced localized etching described in the copending application Serial No. 539,822 of Martin F. Chamow, filed October 11, 1955, now abandoned, entitled "Electrolytic Process."

It will also be appreciated that the process of the present invention may be applied to the fabrication of germanium transistors having P-type base regions by utilizing a P-type dopant metal to produce the low-resistivity surface layer and utilizing as emitter and collector elements metals which form rectifying connections to P-type material when plated thereon or micro-alloyed therewith. As an example, the diffused surface layer may be formed by diffusion of indium into the surface of a high resistivity germanium wafer, in which case micro-alloyed contacts of antimony may be utilized to form the emitter and collector rectifying connections.

The process may also be applied to semiconductive materials of entirely different nature, such as silicon for example. In the case of an NPN silicon transistor, boron is a suitable surface doping material and jet etching may be accomplished by using a solution of 8.4 grams per liter of sodium fluoride and 6 cc. per liter of 49% hydrofluoric acid; preferably the region being etched is illuminated during the process to obtain greater speed and smoothness of etching. Control of the thickness of the silicon during jet etching may be accomplished by utilizing observations of the color of visible light transmitted through the silicon as described in the copending application Serial No. 424,704, now Patent No. 2,875,140, of Thomas V. Sikina, filed April 21, 1954, and entitled "Method and Apparatus for Producing Semiconductive Structures." In the case of silicon, surface-barrier contacts may be utilized in some cases; however, since they tend to be unstable if subjected to wide temperature variations, for many military or commercial purposes it is preferable to employ rectifying emitter and collector contacts formed by slight alloying of an impurity metal with the semiconductor.

While the invention has been described with particular relation to specific embodiments thereof, it will be understood that it is susceptible of embodiment in a variety of forms differing from those specifically described herein without departing from the scope of the invention.

I claim:

1. A method for producing reproducibly and in quantity high-frequency transistors each having emitter, collector and base elements, which method comprises: providing a plurality of bodies of substantially identical semiconductive material; subjecting said plurality of bodies to the same surface diffusion treatment to produce therein surface layers of substantially identical graded-resistivity characteristics, each of said surface layers having an exterior surface which is highly conductive and having a first region beneath said external surface the resistivity of which is substantially higher than that existing at said external surface and whch is suitable for the base material adjacent said emitter element, each of said bodies also containing a second region on the opposite side of said first region from said exterior surface which is of higher resistivity than said first region and suitable for the base material adjacent said collector element; subjecting a typical body of said plurality of bodies to jet-electrolytic etching of a limited portion of said surface layer thereof to etch therein a depression extending into said layer toward said first region thereof; interrupting said etching to apply to said body a rectifying connection at the bottom of said depression and a reverse bias with respect to said rectifying connection, thereby to ascertain the resistivity of said layer at said bottom of said depression; alternating said etching and said application of said rectifying connection and said reverse bias until said etching has proceeded into said layer of said typical body to a depth at which said ascertained resistivity is substantially equal to said resistivity of said first region, the depth of said depression thereby being substantially equal to that required to expose said first region; jet-electrolytically etching a limited portion of said surface layer of each of the others of said plurality of bodies to produce in each of said other bodies a depression of substantially said depth; jet-electrolytically etching each of said other bodies at a surface on the opposite side of said second region from said depression therein to form another depression extending toward said second region therein, said last-named etching being terminated when it has proceded to a depth substantially equal to that required to expose said second region therein; forming two rectifying barriers in each of said other bodies by a process including jet-electrolytically depositing a metal substance on the bottoms of the two opposed depressions formed in each of said bodies by said jet-electrolytic etching; and applying a substantially ohmic connection to each of said other bodies on a portion of said exterior surface of said surface layer thereof lying outside said etched depression therein.

2. The method of providing a lot of semiconductive bodies having external surface regions in which the value of resistivity is substantially the same for different bodies of said lot, said method comprising the steps of forming in said bodies substantially identical surface layers having a graded resistivity in a direction normal to the surface of said bodies, each of said layers containing beneath its external surface a region of said same resistivity value, jet-electrolytically etching in predetermined manner the surface layer of one of said bodies to form a depression therein extending toward said region of said layer, repetitively interrupting said etching to apply a rectifying connection to the bottom of said depression and to bias said connection in the reverse direction with respect to said body, thereby to ascertain the resistivity of the said layer at said bottom of said depression alternating said etching and said application of said rectifying connection and said reverse bias until said etching has proceeded into said layer to a depth at which said ascertained resistivity is substantially equal to said same resistivity value, the depth of said depression thereby being substantially equal to that required to expose said region of said one body, measuring the length of time required when jet etching said surface layer of said one body in said predetermined manner to expose said region therein and jet-electrolytically etching said surface layer of each of the others of said lot of bodies in said predetermined meanner for a time interval substantially equal to said length of time.

3. The method of claim 2, in which said application of said rectifying connection comprises jet-electrolytically plating upon the bottom of said depression in said one body a metal which forms a surface-carrier contact therewith.

References Cited in the file of this patent

UNITED STATES PATENTS

| | | |
|---|---|---|
| 2,767,137 | Evers | Oct. 16, 1956 |
| 2,845,374 | Jones | July 29, 1958 |
| 2,846,346 | Bradley | Aug. 5, 1958 |
| 2,963,411 | Scott | Dec. 6, 1960 |